United States Patent [19]

Smith et al.

[11] Patent Number: 4,508,856

[45] Date of Patent: Apr. 2, 1985

[54] COMPOSITES UTILIZING FILLERS OF SURFACE MODIFIED HOLLOW MICROSPHERES

[75] Inventors: Christopher G. Smith, Flourtown; John F. Peters, Lansdale, both of Pa.

[73] Assignee: PQ Corporation, Valley Forge, Pa.

[21] Appl. No.: 546,232

[22] Filed: Oct. 28, 1983

[51] Int. Cl.³ .................................................. C08J 9/32
[52] U.S. Cl. ................................... 523/218; 428/325; 523/219
[58] Field of Search ................. 428/325; 523/218, 219

[56] References Cited

U.S. PATENT DOCUMENTS

| | | | |
|---|---|---|---|
| 4,340,642 | 7/1982 | Netting et al. | 428/406 |
| 4,403,048 | 9/1983 | Blitstein | 523/218 |
| 4,411,847 | 10/1983 | Netting et al. | 428/402 |
| 4,420,442 | 12/1983 | Sands | 428/402 |
| 4,421,562 | 12/1983 | Sands | 428/325 |

FOREIGN PATENT DOCUMENTS 0026388  4/1981  European Pat. Off. ............ 523/219

*Primary Examiner*—Herbert J. Lilling
*Attorney, Agent, or Firm*—Ernest G. Posner; Fred C. Philpitt; J. S. Stephen Bobb

[57] ABSTRACT

Polymers that are stable under aqueous conditions of high ionic strength are combined with non-fused, silicate based microspheres that are modified with multivalent metals but not washed or dried, said microspheres being present as filters.

4 Claims, No Drawings

COMPOSITES UTILIZING FILLERS OF SURFACE MODIFIED HOLLOW MICROSPHERES

RELATED PATENT DOCUMENTS

This patent application is related to U.S. Pat. No. 4,340,642, issued July 20, 1982, and U.S. patent application Ser. No. 382,826, filed May 27, 1982, now allowed.

BACKGROUND OF THE INVENTION

This invention concerns the use of surface modified, silicate based hollow microspheres as fillers in various composite systems. In particular, this invention comprises the addition of a slurry of said microspheres and salts of a multivalent metal to certain organic polymer systems and to cements and the like, and then setting the system with the hollow microspheres present as a lightweight filler.

U.S. Pat. No. 4,340,642 and U.S. patent application Ser. No. 382,826 now U.S. Pat. No. 4,411,847 describe a method of improving the water resistance of non-fused, silicate based hollow microspheres by modifying their surfaces with suitable multivalent metal ions. These microspheres are altered by contacting slurries of said microspheres with the appropriate metal salt such as $AlCl_3$ or $Al_2(SO_4)$ while controlling the pH. The microspheres are recovered from the slurry, washed and dried. These salt free, dried microspheres are required for polymer systems that are sensitive to salts or anions when they are being processed. The washing and drying steps are expensive and require additional time and energy.

It is an object of this invention to use multivalent metal modified microspheres as fillers in various polymer systems without washing or drying steps.

SUMMARY OF THE INVENTION

Non-fused, silicate based microspheres that are modified with multivalent metals but not washed or dried can be used as fillers in certain water-containing organic polymer systems are in some cements. In general, the systems that will accept such microspheres as fillers may be alkali sensitive, but must be tolerant of neutral or near neutral salts. The microspheres which are a combination of an alkali metal silicate and a "polysalt" are slurried with water while solutions of suitable salts of multivalent metals, such as $AlCl_3$, $Al_2(SO_4)_3$, $Zn(NO_3)_2$ and the like are added. During this addition the pH is also controlled. The treated microspheres are not washed or dried if they are used with the proper polymer systems. They are be dewatered somewhat by filtering, if necessary, but they are not dried. The treated microspheres are added to the polymer or a portion of the polymer and said mixture is stable until it is set by whatever mechanism is used. Setting of the polymer is to mean the hardening of the semiliquid polymer by organic condensation.

THE INVENTION

Hollow microspheres primarily comprising silicate that have not been fused or sintered require surface modification to provide stable properties on exposure to aqueous environments. While many materials benefit from the process of our invention, we prefer to use the microspheres described in U.S. Pat. Nos. 3,794,503, 3,796,777 and 3,880,957. These patents are hereby incorporated by reference as describing the preferred hollow microspheres and the method of preparing them in detail.

Hollow microspheres are prepared by spray drying a homogeneous solution of sodium silicate and a "polysalt." The product from the spray dryer has a particle diameter of 35 to 150 microns (100 to 400 mesh) and less than 25% moisture. This product is heated and the resulting microspheres have diameters of about 5 to 2000 microns (10 to 400 mesh), bulk densities of 2 to 20 lbs/cu ft and less than 7% moisture. The ratio of polysalt solids to sodium silicate solids is 0.02:1 to 2.0:1 and the sodium silicate contains 1.5 to 4.0 moles of $SiO_2$ per mole of $Na_2O$. U.S. Pat. No. 3,794,503 describes "polysalts" as salts with anion to cation ratios that are reduced when the salts dissolve and become hydrolyzed. Ammonium pentaborate, sodium pentaborate and sodium hexametaphosphate are preferred "polysalts," of which ammonium pentaborate is the most preferred.

Any multivalent metal that achieves the desired decrease in solubility of the microspheres is useful in the process of our invention. Examples include among others calcium, magnesium, aluminum and zinc. Such metals are used as the salts of strong acids such as chloride, nitrates, sulfates and the like. The salts are dissolved in any manner required to form a stable solution at a somewhat acid pH. The amount of metal ion required depends on the composition of the microspheres and the degree of property modification desired. In general, 1 part by weight (pbw) is required for each 2 to 20 pbw of microspheres.

The microspheres either from the spray dryer or the second heating step must be slurried with sufficient water to prevent shearing stress and consequent fractures of the microspheres. We find that about 4 to 20% by weight of hollow microspheres is satisfactory. Stirring must be adequate to ensure good mixing when the metal salt solution is added. The rate at which said metal salt solution is added must be controlled to provide a pH in the range which promotes the yield of intact spheres with the desired surface modification. Surprisingly, this pH range must be varied according to the silicate used in preparing the microspheres. If the silicate used has up to about 2.4 moles of $SiO_2$ per mole of $Na_2O$ the pH must be maintained above about 5 with the preferred range of 5.0 to 7.0. If the silicate has about 2.4 to 4.0 moles of $SiO_2$ per mole of $Na_2O$ the pH can be as low as 4 with a preferred range of 4.0 to 6.5. Once all of the metal salt solution has been added and the slurry is at the correct pH it can be stirred for an additional period of up to an hour to provide time for the surface reaction to be completed.

Additional pH buffers and adjusting agents may be required to provide the correct pH. After the reaction is complete the floating microspheres can be separated from the slurry and used as a filler without washing, or the entire slurry may be used.

Our treated microspheres are damp or in a slurry. They have particle diameters of about 5 to 2000 microns. The composition of the microsphere now includes from about 0.1 to about 5.0% of the selected multivalent metal. The damp microspheres or the slurry can be used as fillers in any suitable aqueous, organic or inorganic polymers that are sensitive to alkali that can be released from the prior art microspheres.

The organic polymer systems which require the treated microspheres contain water and are stable when exposed to high concentrations of ions in an approximately neutral or slightly acid pH. As indicated, our microspheres are treated to pH values between about 4 and 7. These polymers are usually available as emulsions or suspensions in water. Examples include acrylic emulsions, natural rubbers, and some epoxies.

EXAMPLES

The following examples illustrate certain embodiments of our invention. These examples are not provided to establish the scope of the invention, which is described in the disclosure and recited in the claims. The proportions are in parts by weight (pbw) or percent by weight (% wt/wt) unless otherwise indicated.

EXAMPLE 1

This example illustrates the preparation of treated microspheres and their incorporation into a polymer system according to our invention as well as some comparisons. The hollow microspheres were made with a sodium silicate having 2.0 moles of $SiO_2$ per mole of $Na_2O$, according to the process described in Example 1 of U.S. Pat. No. 3,796,777.

The microspheres (250 pbw) were slurried in 6000 pbw of water. An aluminum sulfate solution (16.7% wt/wt) was added at a rate sufficient to maintain the pH between about 5.0 and 5.5. After a steady pH of 5 was attained addition of the sulfate was stopped; 142 pbw of $Al_2SO_4$ solids were required for the 250 pbw of microspheres. Three samples were collected and processed as follows. Sample 1-I was simply collected as is according to the present invention, sample 1-II was washed with water but not dried, and sample 1-III was washed with acetone according to the teaching of U.S. Pat. No. 4,340,642.

A portion of each of these samples and the original microspheres (sample 1-IV) were added to a commercial acrylic latex polymer (Rohm & Haas, Roplex E-330). The proportions were such that there was 12 pbw of the microspheres for each 90 pbw of the latex. The mixtures were tested for viscosity (Brookfield RVT viscometer, #3 spindle, 100 RPM at 25° C.) and density. These mixtures were stored at 158° F. for 24 and 144 hours and the viscosities and densities determined. The results were as follows.

TABLE 1

| Sample | Viscosity (cP) | | | Density (g/cc) | | |
|---|---|---|---|---|---|---|
| | Initial | 24 Hours | 144 Hours | Initial | 24 Hours | 144 Hours |
| 1-I | 40 | 40 | 45 | 0.935 | 0.964 | 0.993 |
| 1-II | 50 | 55 | 45 | 0.947 | 0.964 | 0.998 |
| 1-III | 50 | 60 | 110 | 0.899 | 0.904 | 0.901 |

TABLE 1-continued

| Sample | Viscosity (cP) | | | Density (g/cc) | | |
|---|---|---|---|---|---|---|
| | Initial | 24 Hours | 144 Hours | Initial | 24 Hours | 144 Hours |
| 1-IV | 45 | * | * | 0.935 | * | * |

*Not measurable-mixture had coagulated to form a hard lump of material that could not be dispersed.

The same resin microsphere combination was also tested at a higher loading. The proportions were such that there were 50 pbw of microspheres and 75 pbw of the latex. The viscosities were measured with spindle #4 at 100 RPM at 23° C. The results were as follows.

TABLE 2

| Sample | Viscosity (cP) | | | Density (g/cc) | | |
|---|---|---|---|---|---|---|
| | Initial | 24 Hours | 144 Hours | Initial | 24 Hours | 144 Hours |
| 1-I | 40 | 40 | 40 | 0.791 | 0.844 | 0.848 |
| 1-II | 40 | 40 | 40 | 0.713 | 0.712 | 0.761 |
| 1-III | 60 | * | * | 0.729 | * | * |
| 1-IV | 40 | ** | ** | 0.740 | ** | ** |

*Mixture gelled.
**Mixture dried out from action of the microsphere.

These results indicate that treated microspheres provide advantages over untreated materials and that, surprisingly, the combination of our invention (an unwashed microsphere and a salt-tolerant polymer) is as effective as, or in some cases more effective than, the treated microspheres that have been prepared as described in the prior art.

We claim:

1. In the method of using water resistant non-fused microspheres as fillers for polymer systems wherein the microspheres are characterized by a weight percent ratio of "polysalt" solids to sodium silicate solids of 0.02:1 to 2.0:1, said sodium silicate containing 1.5 to 4.0 moles of $SiO_2$ per mole of $Na_2O$; a particle size of about 5 to 2000 microns; less than 7% (wt/wt) moisture and 0.1 to 5.0% (wt/wt) of a multivalent metal that decreases the solubility of the microsphere in water; the improvement comprising combining said microspheres having pH values between about 4 and 7 in water that have not been washed free of anions with an aqueous emulsion or suspension of a polymer that is not sensitive to high ionic concentrations and setting said polymer which now contains the microspheres.

2. The method of claim 1 wherein the multivalent metal is calcium, magnesium, aluminum or zinc.

3. The method of claim 1 wherein the "polysalt" is ammonium pentaborate, sodium pentaborate or sodium hexametaphosphate.

4. The method of claim 1 wherein the polymer is an acrylic emulsion, a natural rubber emulsion or an epoxy.

* * * * *